United States Patent
Liao

(10) Patent No.: US 8,544,871 B1
(45) Date of Patent: Oct. 1, 2013

(54) THREE-FOLD THREE-WHEEL GOLF BAG CART FOLDING DEVICE

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 0 days.

(21) Appl. No.: 13/469,149

(22) Filed: May 11, 2012

(51) Int. Cl.
 *B62B 1/00* (2006.01)
(52) U.S. Cl.
 USPC .............. 280/651; 280/62; 280/645; 280/654
(58) Field of Classification Search
 USPC ........ 280/651, 62, 654, 643, 642, 40, 47.315, 280/47.34, DIG. 5, 650
 See application file for complete search history.

(56) References Cited

U.S. PATENT DOCUMENTS

| | | | | |
|---|---|---|---|---|
| 4,793,622 | A * | 12/1988 | Sydlow | 280/40 |
| 5,193,842 | A * | 3/1993 | Fontenot | 280/645 |
| 5,695,212 | A * | 12/1997 | Hinkston | 280/642 |
| 6,099,020 | A * | 8/2000 | Liao | 280/643 |
| 6,168,174 | B1 * | 1/2001 | MacDougall | 280/47.34 |
| 6,299,195 | B1 * | 10/2001 | Chan | 280/651 |
| 6,390,216 | B1 * | 5/2002 | Sueshige et al. | 280/DIG. 5 |
| 6,695,324 | B1 * | 2/2004 | Wu | 280/47.315 |
| 7,770,912 | B2 * | 8/2010 | Liao | 280/651 |
| 2012/0306182 | A1 * | 12/2012 | Liao | 280/651 |

* cited by examiner

*Primary Examiner* — Hau Phan
(74) *Attorney, Agent, or Firm* — Kamrath IP Lawfirm, P.A.; Alan Kamrath

(57) ABSTRACT

A three-fold three-wheel golf bag cart folding device includes a main shaft, a rear wheel set, a link mechanism, a lower cart frame, a front wheel set and an upper cart frame, and the upper cart frame can be pulled and rear wheels can be driven by the link mechanism to fold or unfold, such that the golf bag cart can be folded into a flat shape by a simple and easy operation to achieve the effects of reducing the storage space and facilitating users to carry and transport the cart.

3 Claims, 11 Drawing Sheets

THREE-FOLD THREE-WHEEL GOLF BAG CART FOLDING DEVICE

BACKGROUND OF THE INVENTION

1. Field of the Invention

The present invention relates to a three-fold three-wheel golf bag cart folding device, in particular to the device capable of synchronously folding rear wheels to a lower cart frame to achieve a flat status, so as to skip additional steps of removing and storing the rear wheels. The invention not only prevents staining users, but also facilitates users to carry and transport the golf cart, and thus achieving the effects of reducing the storage space and providing a simple and convenient operation.

2. Description of the Related Art

In a conventional three-wheel golf bag cart, rear wheels are fixed and generally occupy much space and require a relatively large storage space when the golf bag cart is folded. When it is necessary to remove the rear wheels, users have to bend or squat to remove the rear wheels, not only causing complicated and inconvenient operations and poor postures, but also staining the user's body or clothes easily. Obviously, this conventional golf bag cart requires improvements.

SUMMARY OF THE INVENTION

Therefore, it is a primary objective of the present invention to provide a three-fold three-wheel golf bag cart folding device capable of synchronously folding rear wheels to a lower cart frame to achieve a flat status to reduce the storage space and skip additional steps of removing and storing the rear wheels. The invention not only prevents staining users, but also facilitates users to carry and transport the golf cart.

DETAILED DESCRIPTION OF THE PREFERRED EMBODIMENTS

Figure 1:
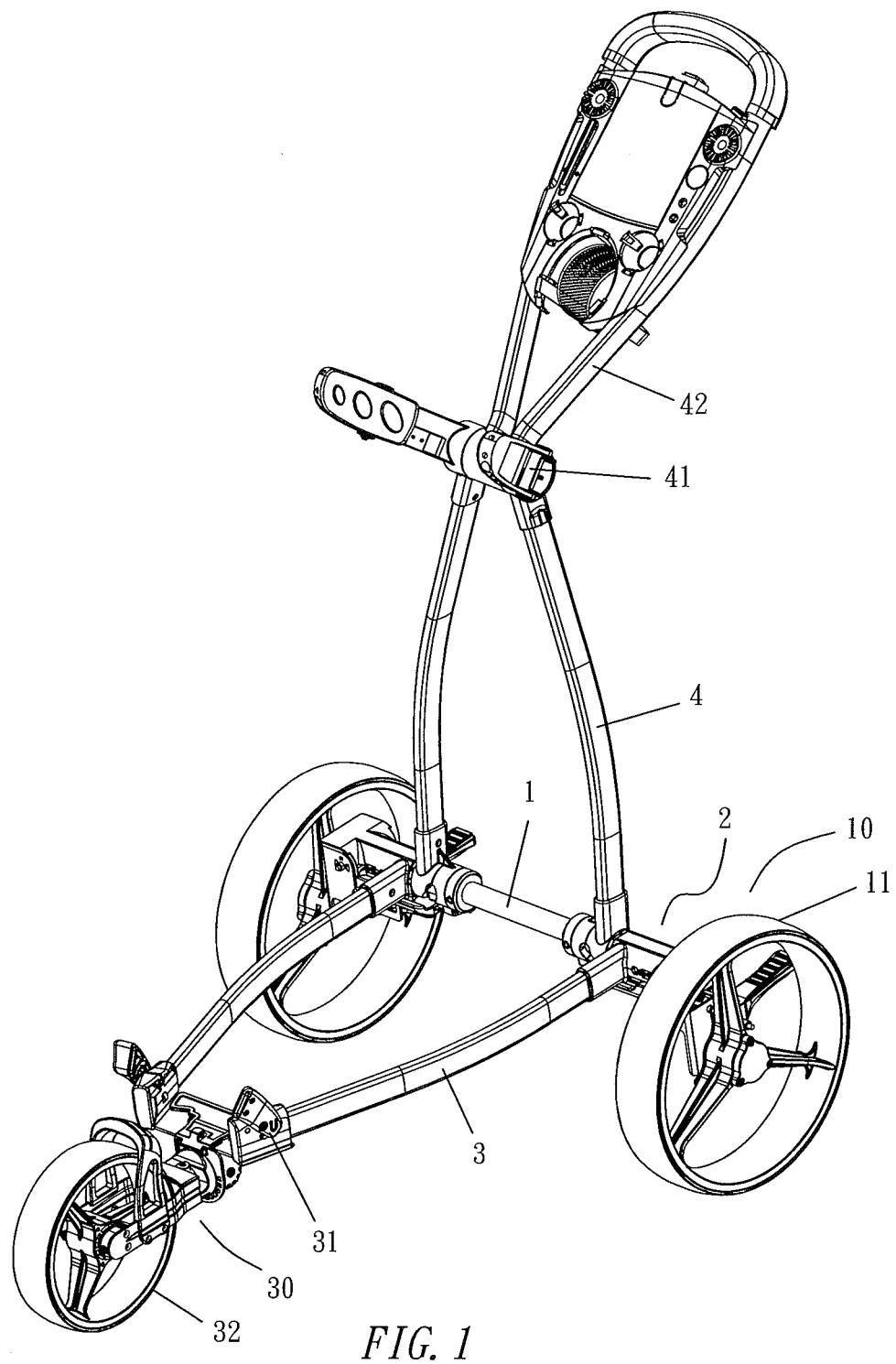
FIG. 1 is a perspective view of the present invention.
Figure 2:
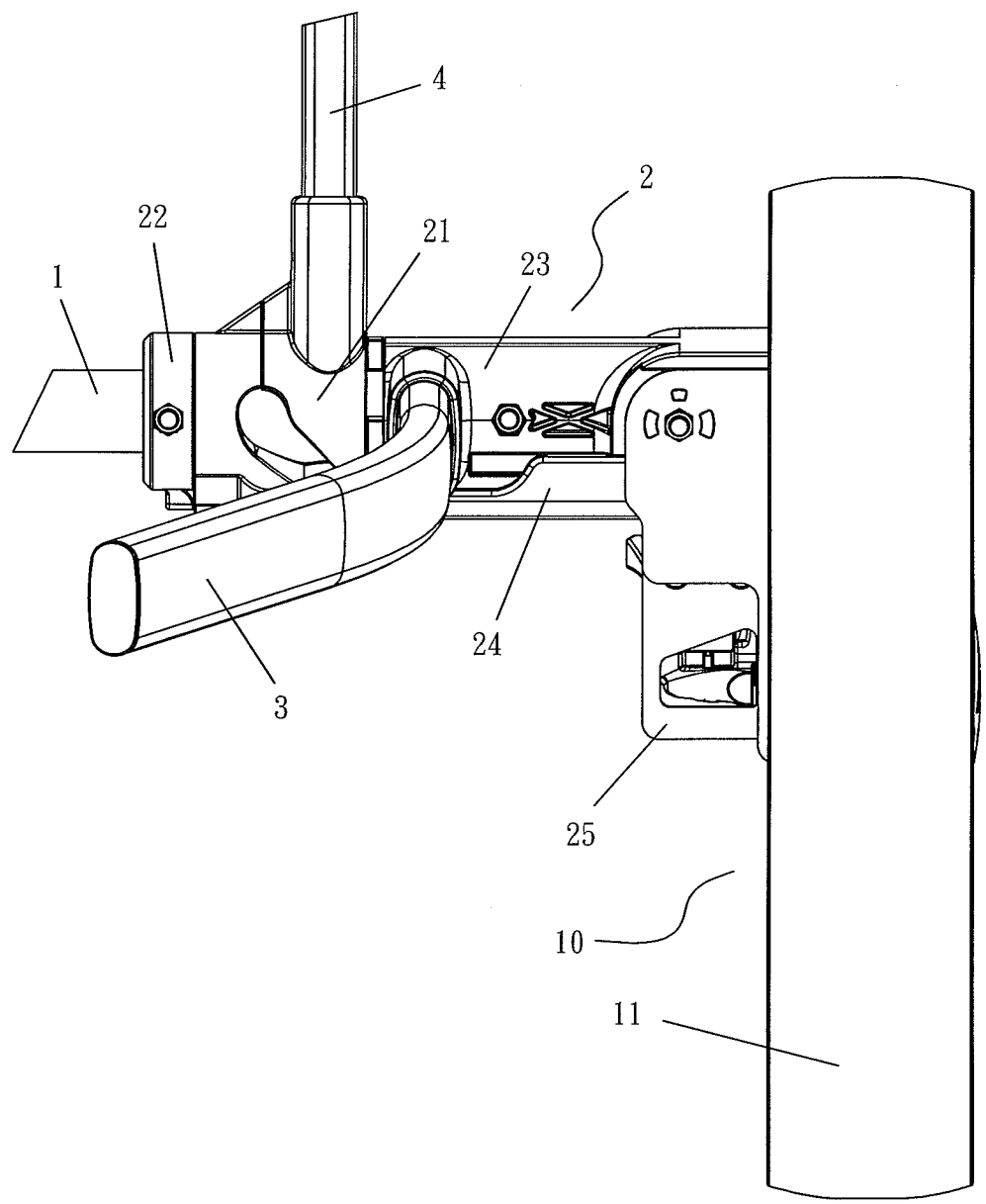
FIG. 2 is a perspective front view of a link mechanism of the present invention.

To make it easier for our examiner to understand the technical characteristics and measures of the present invention to achieve the aforementioned objects and effects, we use preferred embodiments with related drawings for the detailed description of the present invention as follows.

With reference to FIGS. 1 to 7, the cart body of the present invention is symmetrically on both left and right sides. For simplicity, only one side of the structure is described below.

The present invention comprises a main shaft 1, a rear wheel set 10, a link mechanism 2, a lower cart frame 3, a front wheel set 30 and an upper cart frame 4.

The main shaft 1 includes a rear wheel set 10 installed on both sides of the main shaft 1 separately, and the rear wheel set 10 has a rear wheel 11.

The link mechanism 2 is installed at both ends of the main shaft 1 and comprises: a rocker rotating member 21 sheathed on the main shaft 1, and an end of the rocker rotating member 21 being fixed, blocked and positioned at a limit member 22 of the main shaft 1, and the other end of the rocker rotating member 21 having two convex latch members 211, and the middle of the rocker rotating member 21 has an arc groove 212; a rocker body 23, sheathed and fixed to the main shaft 1, and having two concave latch grooves 231 and a stop member 232 formed at an end of the rocker body 23 and latched with the convex latch member 211 of the rocker rotating member 21, such that the rocker rotating member 21 is coupled to the rocker body 23, and the rotating range of the rocker rotating member 21 is limited, and a runner 233 being formed on each external side of the rocker body 23 separately; a rocker slider 24, disposed under the rocker body 23 and having a protruding pillar 241, two slide rails 242 and two racks 243, and the protruding pillar 241 being disposed in the arc groove 212 of the rocker rotating member 21, and the slide rail 242 being wedged into the runner 233 of the rocker body 23 to position the rocker slider 24 and shift the rocker slider 24 to the left and right sides; and a rocker connecting plate 25, with a lower end coupled to a wheel axle 111 of the rear wheel 11, and having two gears 251 installed at an upper end of the rocker connecting plate 25 and engaged with the rack 243 of the rocker slider 24.

The lower cart frame 3 is substantially in a triangular shape, and includes a lower supporting base 31 disposed at an end of the lower cart frame 3 and coupled to a front wheel set 30, and the front wheel set 30 comprises a front wheel 32, and the other end of the lower cart frame 3 is coupled to the link mechanism 2 (or the rocker body 23).

The upper cart frame 4 is substantially in a triangular shape and corresponding to the lower cart frame 3, and the lower end of the upper cart frame 4 is coupled to the link mechanism 2 (or the rocker rotating member 21) and the upper end of the upper cart frame 4 has an upper supporting base 41 and a handle set 42, and the handle set 42 is substantially in a triangular shape and pivotally coupled to the upper supporting base 41, wherein the inclination of the handle set 42 can be adjust to fit users of different heights.

With the aforementioned structural assembly, when the gold cart of the present invention is unfolded as shown in FIG. 1, the upper cart frame 4 and the lower cart frame 3 are almost perpendicular to each other. Now, the protruding pillar 241 of the rocker slider 24 in the link mechanism 2 is disposed under the arc groove 212 of the rocker rotating member 21, and the slide rail 242 is disposed at an end of the runner 232 of the rocker body 23, and the rack 243 is engaged with the gear 251 of the rocker connecting plate 25 as shown in FIGS. 4 to 7.

Figure 8:
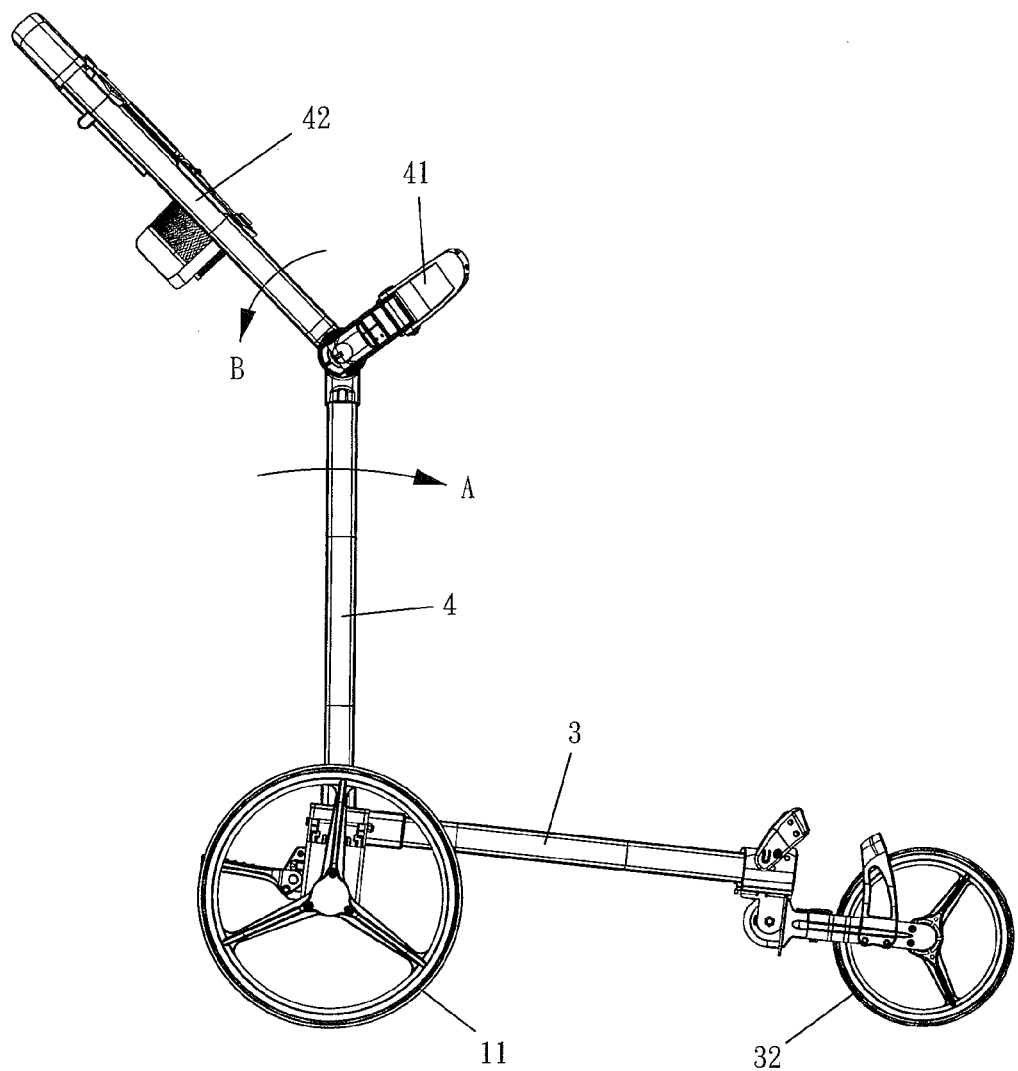
FIG. 8 is a schematic view of folding a golf cart of the present invention.
Figure 9:
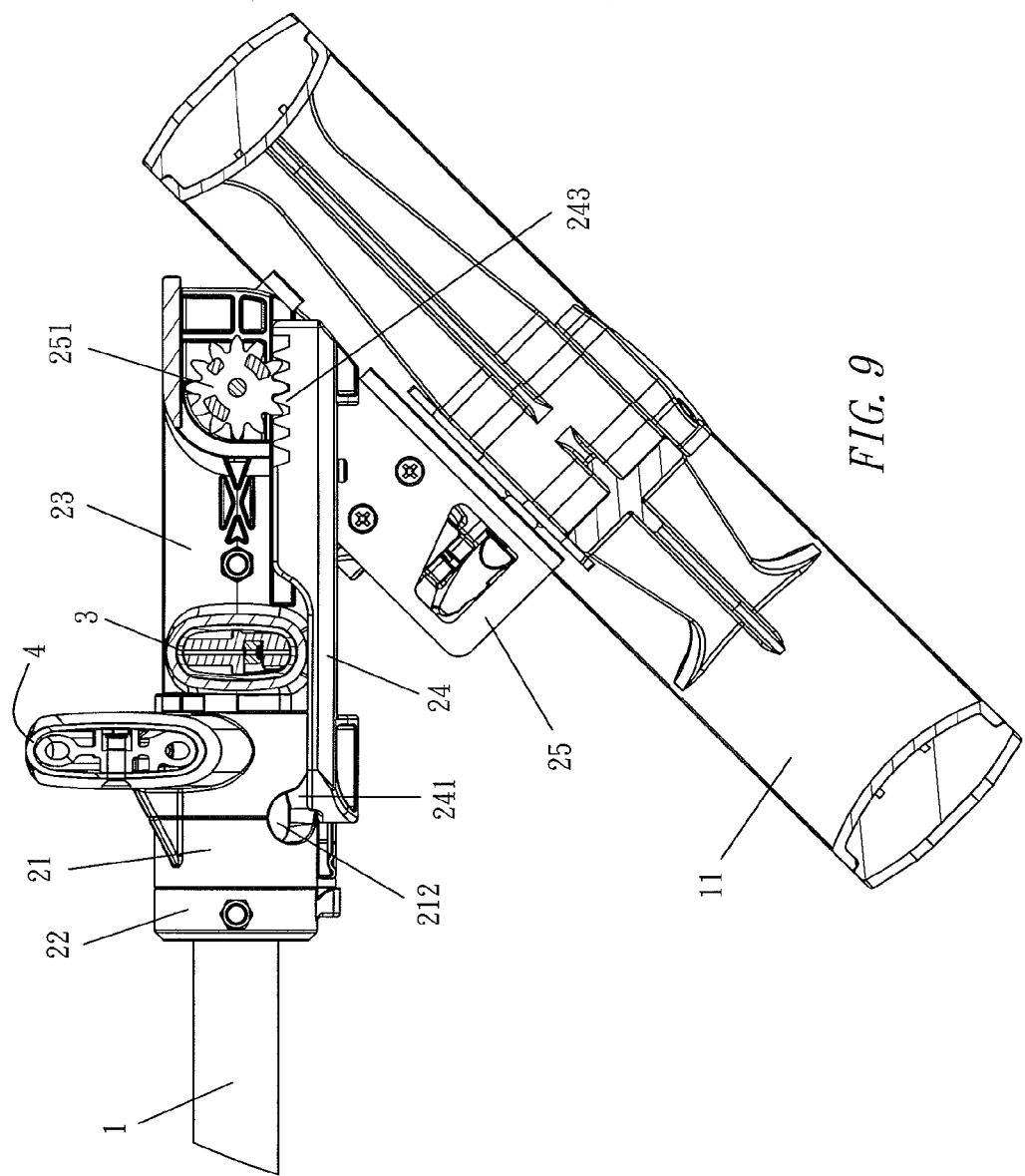
FIG. 9 is a first cross-sectional view of a link mechanism of the present invention when the golf cart is folded.
Figure 10:
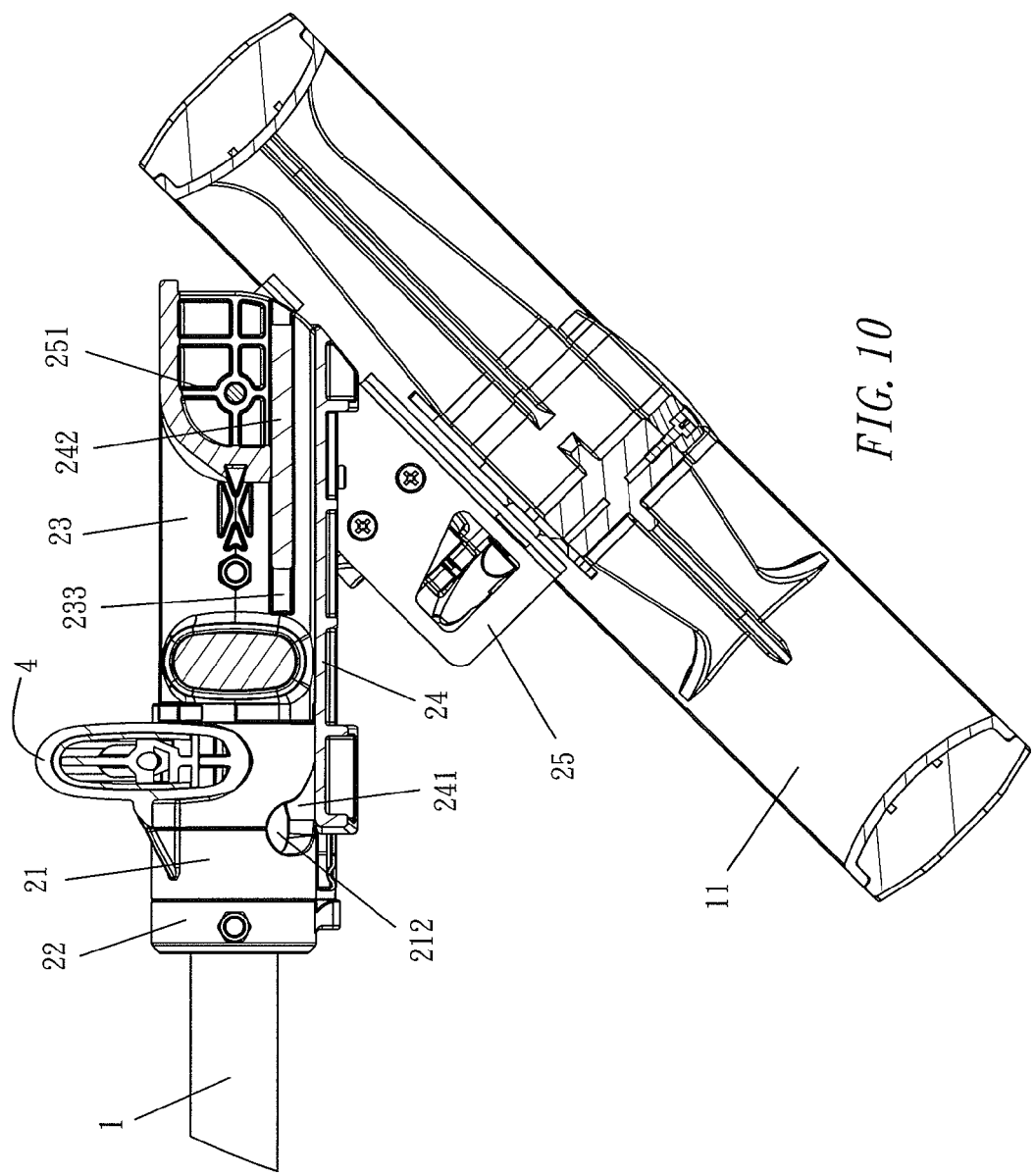
FIG. 10 is a second cross-sectional view of a link mechanism of the present invention when the golf cart is folded.
Figure 11:
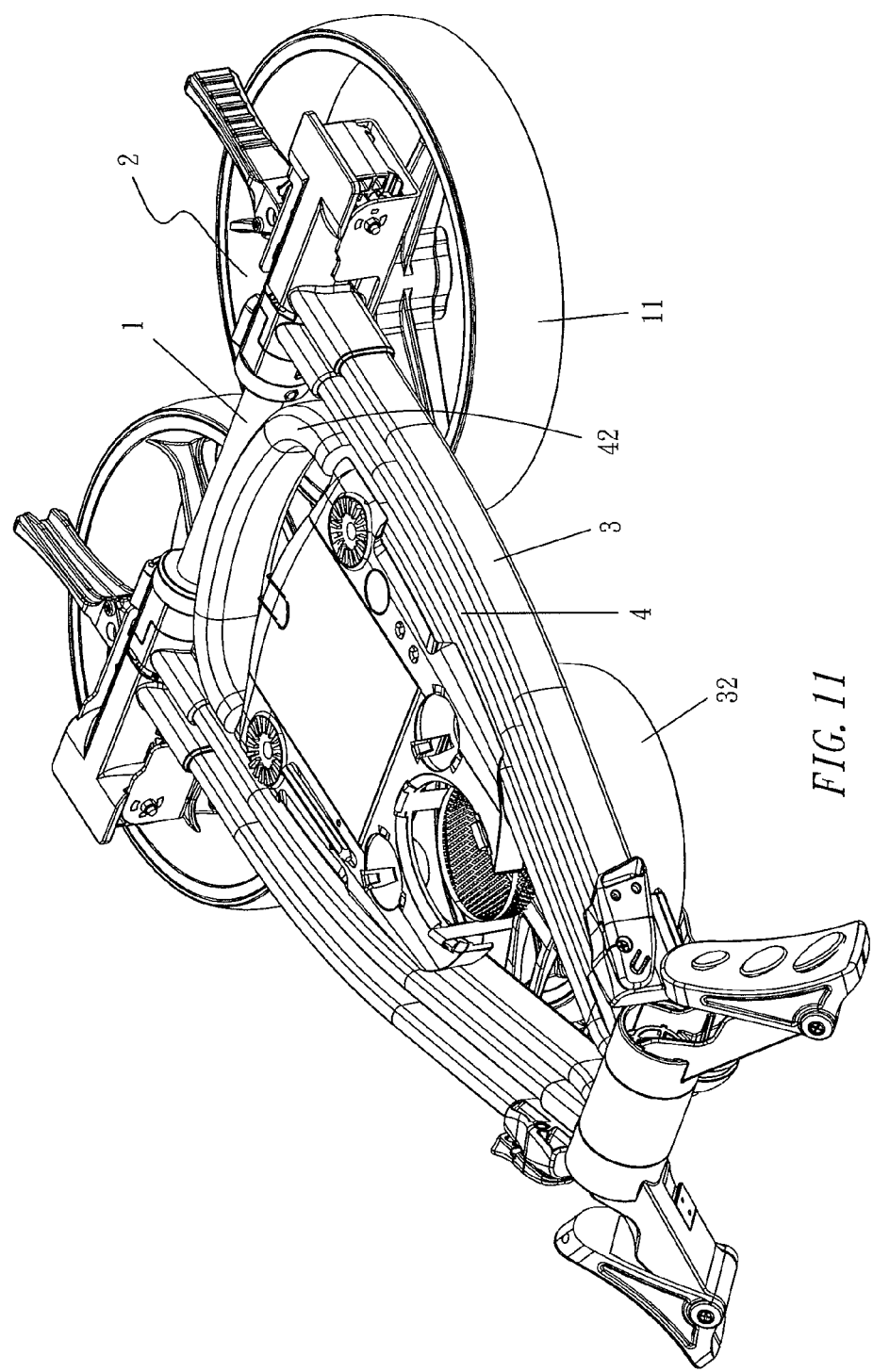
FIG. 11 is a perspective view of a completely folded golf cart of the present invention.

If it is necessary to fold the golf bag cart, a user simply needs to pull the upper cart frame 4 downwardly towards the front as indicated by the arrowhead A in FIG. 8, and the rocker rotating member 21 is driven to rotate, while the rocker slider 24 is moved linearly to produce a displacement since the arc groove 211 of the rocker rotating member 21 is rotated to drive the protruding pillar 241, and moved restrictively towards the left (or right) side. In the meantime, the rack 243 drives the gear 251 to rotate, so that the rocker connecting plate 25 will be turned towards the inside accordingly to drive the rear wheels 11 to be folded inwardly and gradually as shown in FIGS. 9 and 10 until the rocker connecting plate 25 and the rear wheel 11 are rotated inwardly to 90 degrees, and are attached flatly with the lower cart frame 3. Now, the upper cart frame 4 is accommodated in the lower cart frame 3, and the handle set 42 is further pulled downwardly towards the rear as indicated by the arrowhead B in FIG. 8, so that the handle set 42 is accommodated and stored in the upper cart frame 4, and finally the front wheel 32 is folded and attached flatly with the bottom of the lower cart frame 3, and the whole golf bag cart is folded completely into a flat shape as shown in FIG. 11.

If it is necessary to unfold the cart, the user simply reverse the steps of the aforementioned procedure by unfolding the front wheel 32 and then the handle set 42, and pulling the upper cart frame 4 upwardly towards the rear, and the link of the link mechanism 2 can unfold the rear wheel 11 to resume the unfolded condition as shown in FIG. 1.

In addition, the present invention may include the following.

Figure 3:
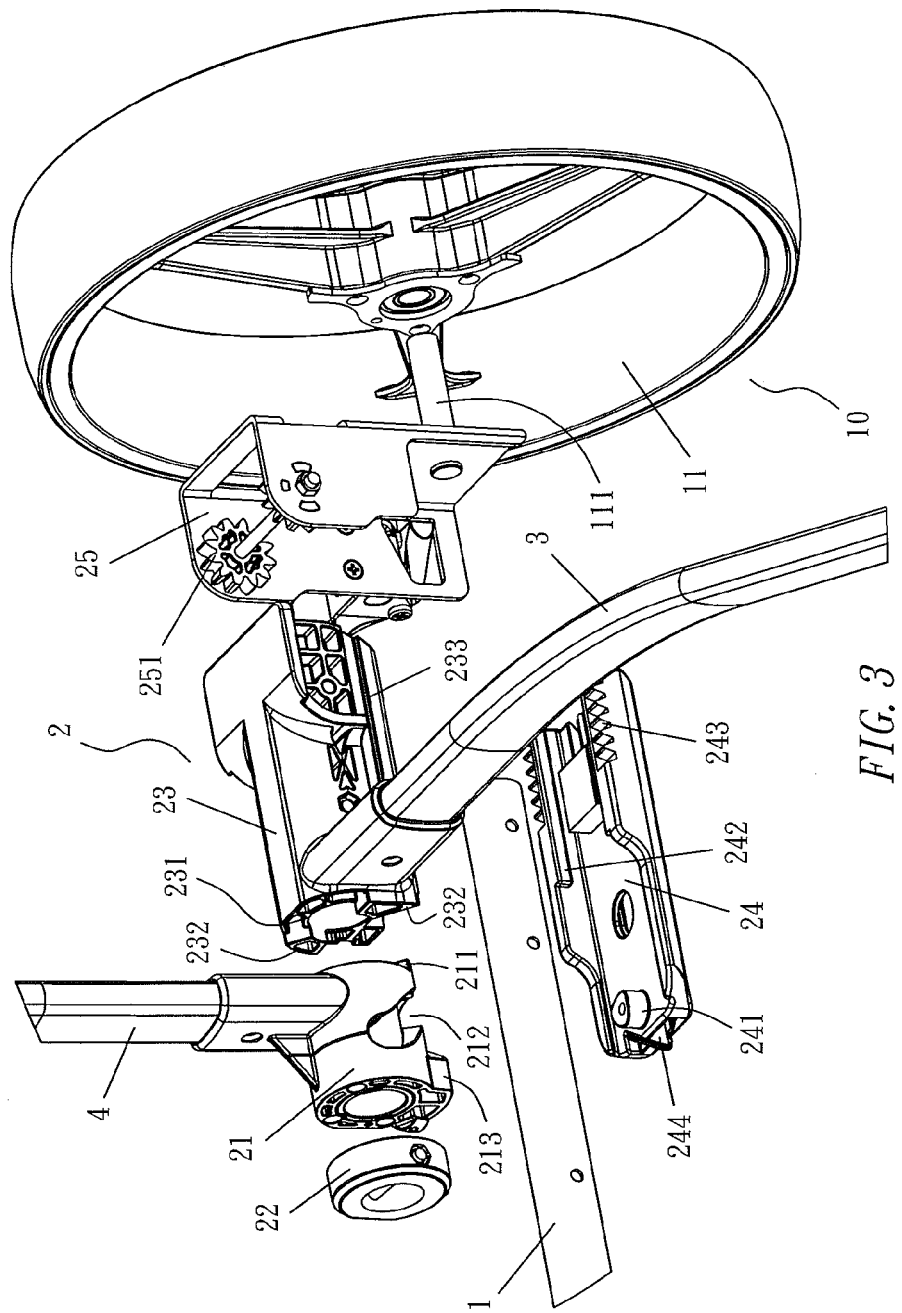
FIG. 3 is a perspective exploded view of a link mechanism of the present invention.
Figure 4:
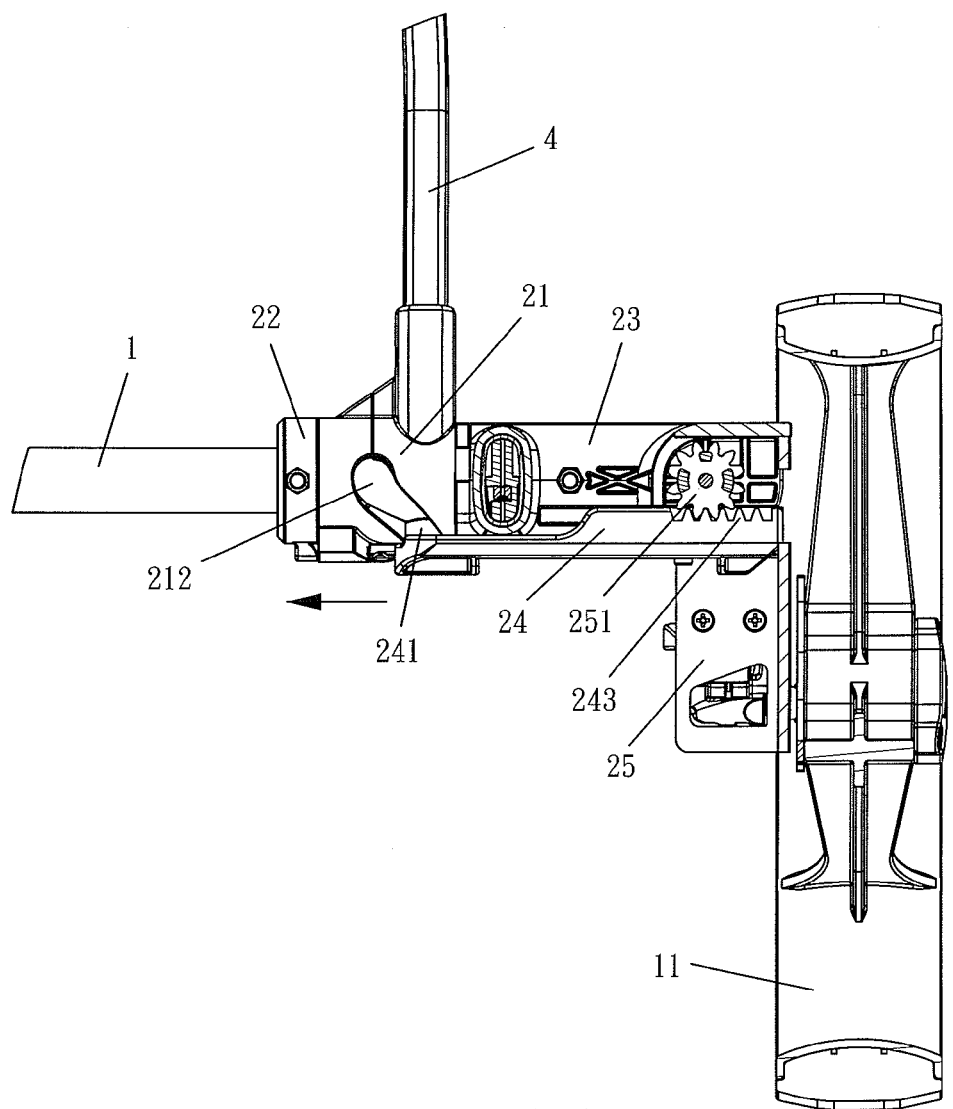
FIG. 4 is a first cross-sectional view of a link mechanism of the present invention.
Figure 5:
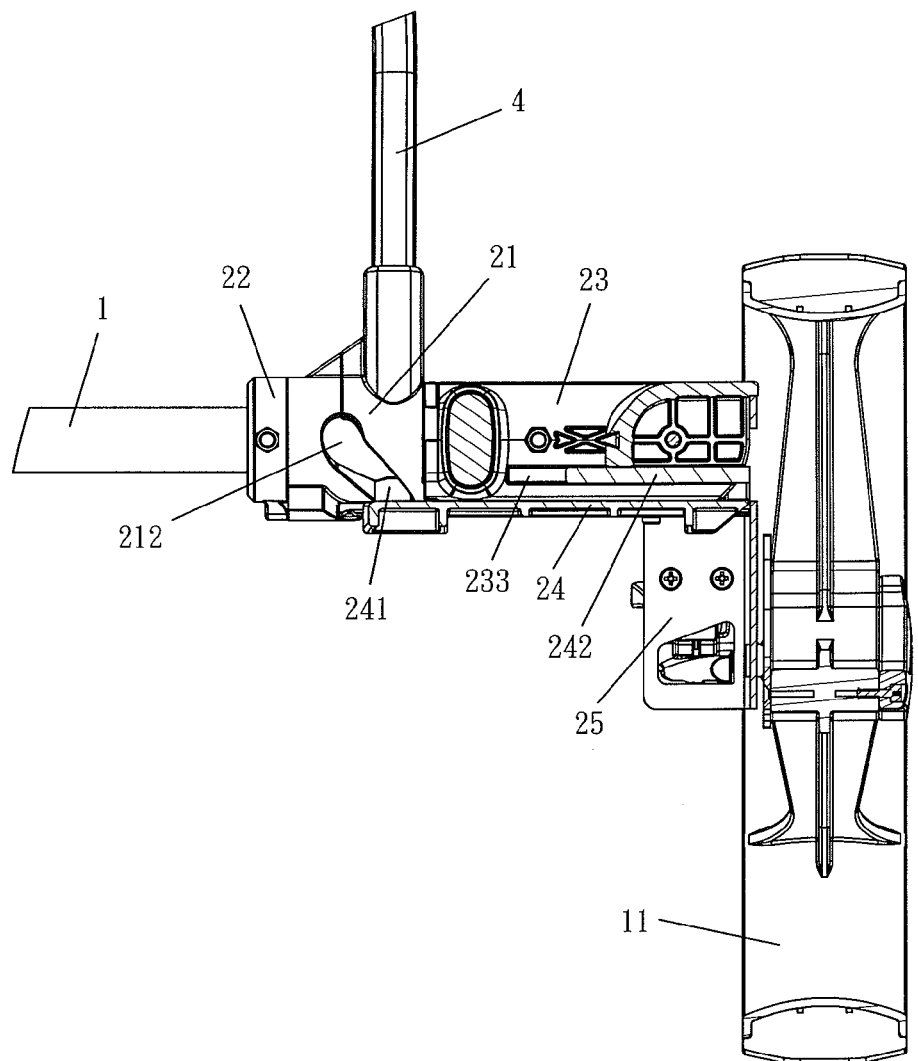
FIG. 5 is a second cross-sectional view of a link mechanism of the present invention.
Figure 6:
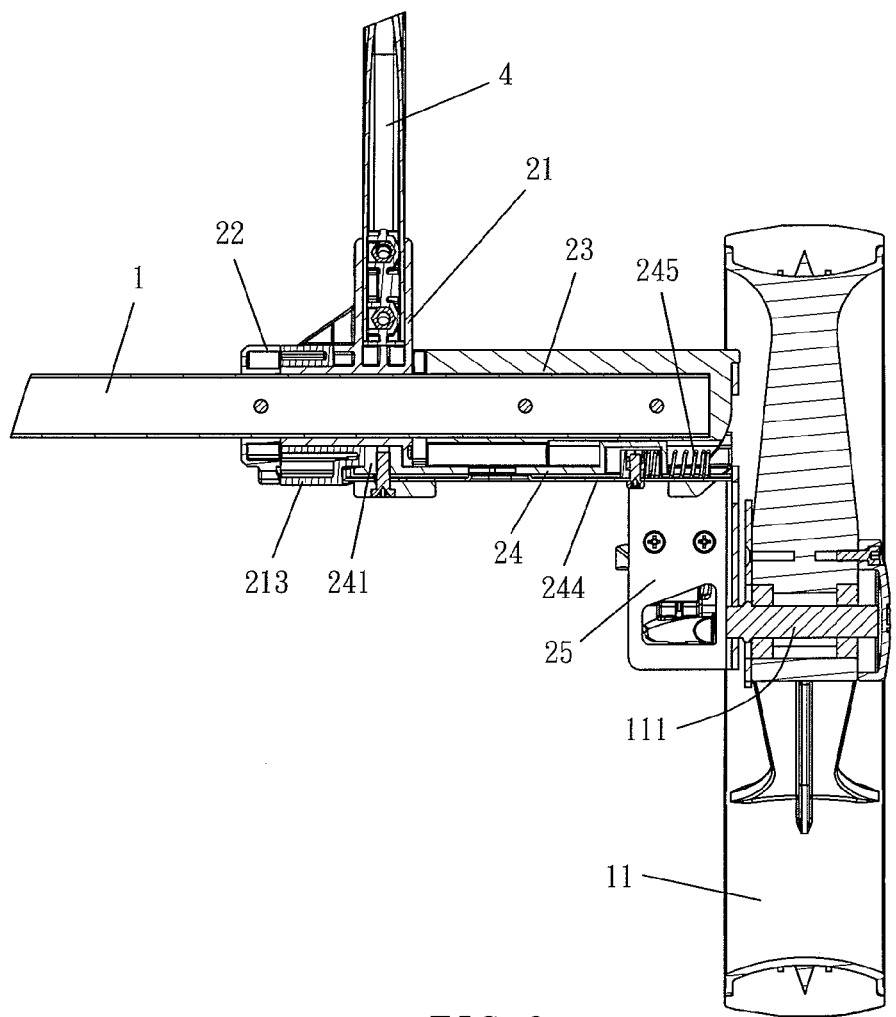
FIG. 6 is a third cross-sectional view of a link mechanism of the present invention.
Figure 7:
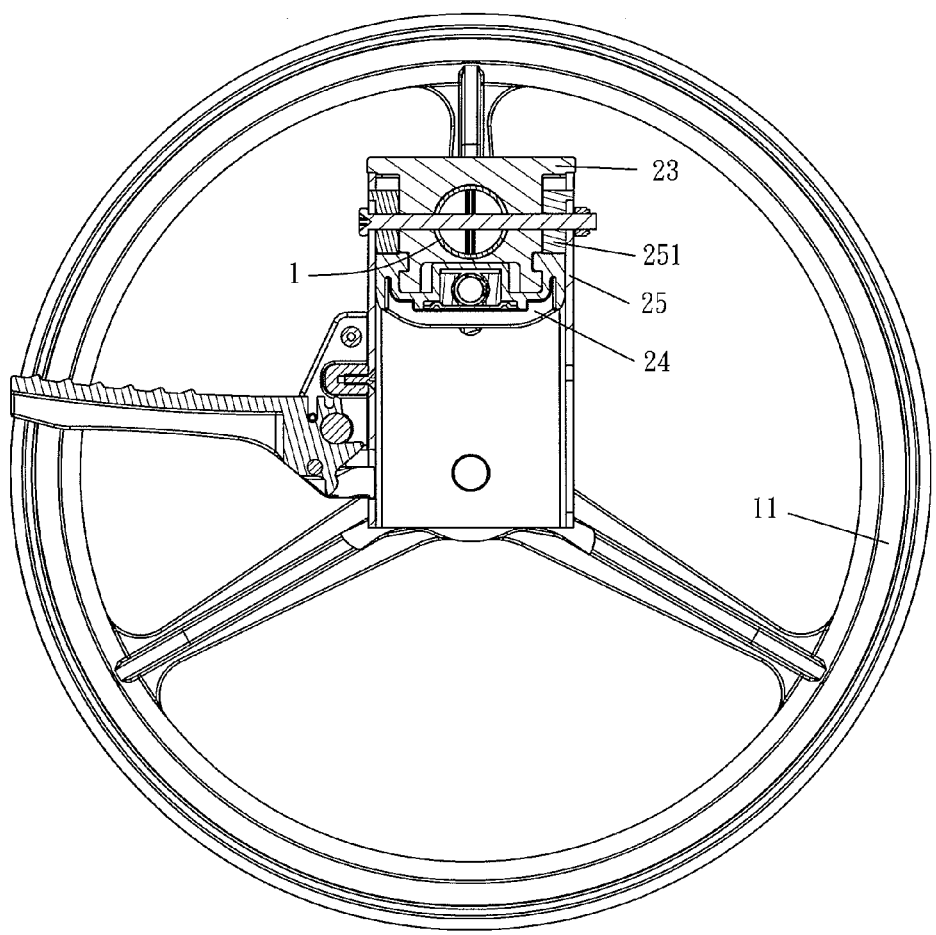
FIG. 7 is a fourth cross-sectional view of a link mechanism of the present invention.

1. An auxiliary stop member 213 can be installed at the other end of the rocker rotating member 21 in the link mechanism 2, wherein the auxiliary stop member 213 has an oblique surface, and the rocker slider 24 has an elastic auxiliary stop plate 244 as shown in FIGS. 3 and 6, and the auxiliary stop plate 244 also has an oblique surface, and a spring 245 is installed at a rear end of the auxiliary stop plate 244 for fixing the rocker slider 24.
2. The lower cart frame 3, the upper cart frame 4 and the handle set 42 of the present invention are arranged substantially a triangular shape, such that when the cart is folded, and the upper cart frame 4 is stored in the lower cart frame 3, and the handle set 42 is stored in the upper cart frame 4 as shown in FIG. 11, so that after the cart of the present invention is folded completely, the lower cart frame 3, the upper cart frame 4 and the handle set 42 are in the same plane, such that the folded cart is in a flat shape to achieve the effects of reducing the storage space and facilitating the users to carry and transport the cart.
3. The main shaft 1 of the present invention is rigid and can be used as a part of lower cart frame 3, so that the present invention generally includes an upper cart frame 4 and a lower cart frame 3 coupled by the link mechanism 2.
4. The link mechanism 2 of the present invention comprises a rocker rotating member 21 that can be rotated reciprocally, a rocker slider 24 that can be driven by the rocker rotating member 21 to shift to the left and right sides, and a rocker connecting plate 25 that can be driven and rotated by the rocker slider 24 to drive the rear wheels 11 to be folded or unfolded synchronously.

In summation of the description above, the present invention has one or more of the following advantages and effect
1. When the cart is folded, the rear wheels 11 are synchronously folded towards the lower cart frame 3 and attached flatly with each other, so as to skip additional steps of removing and storing the rear wheels and prevent staining the users.
2. After the cart is folded completely, the whole cart is in a flat shape, not only reducing the storage space, but also facilitating users to carry or transport the cart.
3. Both the folding and unfolding operations are simple and easy.

Thus, the present invention improves over the prior art and complies with patent application requirements, and thus is duly file for patent application. While the invention has been described by means of specific embodiments, numerous modifications and variations could be made thereto by those skilled in the art without departing from the scope and spirit of the invention set forth in the claims.

What is claimed is:

1. A three-fold three-wheel golf bag cart folding device, comprising:
   a main shaft, having a rear wheel set installed on both sides of the main shaft separately, and the rear wheel set having a rear wheel;
   a link mechanism, installed on the main shaft, and having a rocker rotating member capable of rotating reciprocally, a rocker slider driven by the rocker rotating member to displace sideway, and a rocker connecting plate driven by the rocker slider to rotate, and the rocker connecting plate being fixed to a wheel axle of the rear wheel;
   a lower cart frame, having a lower bag supporting base disposed at an end of the lower cart frame, and coupled to a front wheel set, and the front wheel set having a front wheel, and the other end of the lower cart frame being coupled to the link mechanism; and
   an upper cart frame, with a lower end coupled to the link mechanism, and an upper end having an upper bag supporting base and a handle set;
   such that when the upper cart frame is pulled, and the link mechanism drives the rear wheels to fold or unfold synchronously, and a golf bag cart can be folded into a flat shape by a simple and easy operation to achieve the effects of reducing the storage space and facilitating users to carry and transport the cart.

2. The three-fold three-wheel golf bag cart folding device of claim 1, wherein the link mechanism comprises:
   a rocker rotating member, installed on the main shaft, and fixed to the upper cart frame, and an end of the rocker rotating member being fixed, blocked and positioned at a limit member of the main shaft, and the other end of the rocker rotating member having two convex latch members, and the middle of the rocker rotating member having an arc groove;
   a rocker body, fixed onto the main shaft, and having two concave latch grooves and a stop member formed at an end of the rocker body and latched with the convex latch member to limit a rotating range of the rocker rotating member, and a runner disposed on each external side of the rocker body;
   a rocker slider, disposed under the rocker body, and having a protruding pillar, two slide rails and two racks, and the protruding pillar being disposed in the arc groove, and the slide rail being wedged into the runner for positioning the rocker slider; and
   a rocker connecting plate, with a lower end coupled to a wheel axle of the rear wheel, and having two gears installed at an upper end of the rocker connecting plate and engaged with the rack.

3. The three-fold three-wheel golf bag cart folding device of claim 1, wherein the lower cart frame, the upper cart frame and the handle set are arranged into a triangular shape, and after the cart is folded completely, the lower cart frame, the upper cart frame and the handle set are in the same plane.

\* \* \* \* \*